United States Patent
Sakhnini et al.

(10) Patent No.: US 12,382,490 B2
(45) Date of Patent: Aug. 5, 2025

(54) HIGH/LOW SCS RO ALIGNMENT

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 621 days.

(21) Appl. No.: 17/649,580

(22) Filed: Feb. 1, 2022

(65) Prior Publication Data

US 2022/0256589 A1 Aug. 11, 2022

Related U.S. Application Data

(60) Provisional application No. 63/144,840, filed on Feb. 2, 2021.

(51) Int. Cl.
*H04W 74/00* (2009.01)
*H04L 5/00* (2006.01)

(52) U.S. Cl.
CPC ......... *H04W 74/004* (2013.01); *H04L 5/0023* (2013.01); *H04L 5/0048* (2013.01)

(58) Field of Classification Search
CPC ... H04W 74/004; H04L 5/0023; H04L 5/0048
See application file for complete search history.

(56) References Cited

U.S. PATENT DOCUMENTS

| | | |
|---|---|---|
| 2021/0204326 A1* | 7/2021 | Zhang ............... H04W 72/23 |
| 2023/0247676 A1* | 8/2023 | Shin ............... H04W 52/0216 |

OTHER PUBLICATIONS

3GPP: "3rd Generation Partnership Project, Technical Specification Group Radio Access Network, NR, Physical Channels and Modulation (Release 16)", TS 38.211 V16.4.0, Dec. 2020, 133 Pages, Sections 7.4.2 and 7.4.3.
CMCC: Revised WID: Extending Current NR Operation to 71 GHz, RP-202925, (Previous Version RP-201845), 3GPP TSG RAN Meeting #90-e Electronic Meeting, Dec. 7-11, 2020, 6 Pages.

* cited by examiner

*Primary Examiner* — Faruk Hamza
*Assistant Examiner* — Alan L Lindenbaum
(74) *Attorney, Agent, or Firm* — Procopio, Cory, Hargreaves & Savitch LLP

(57) ABSTRACT

Apparatus, methods, and computer program products for SCS RO alignment are provided. An example method includes transmitting, to a base station, a physical random access channel (PRACH) preamble in one RACH occasion (RO) in a first set of ROs in one or more PRACH slots associated with a first subcarrier spacing (SCS), the one or more PRACH slots being within a duration defined based on a PRACH slots time duration for a second subcarrier spacing (SCS). The example method further includes receiving, from the base station, a PRACH response.

28 Claims, 12 Drawing Sheets

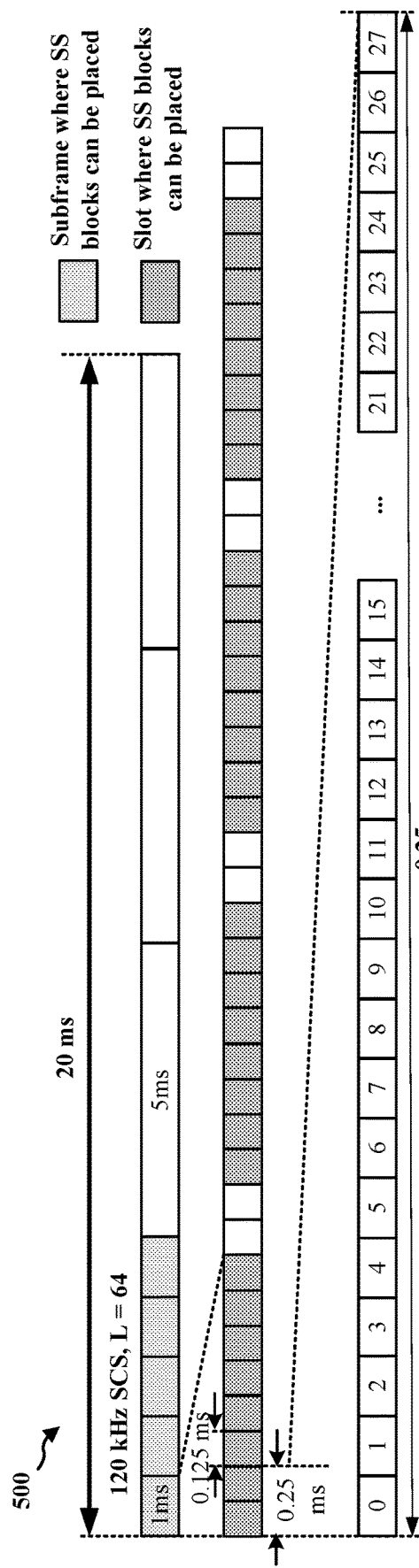
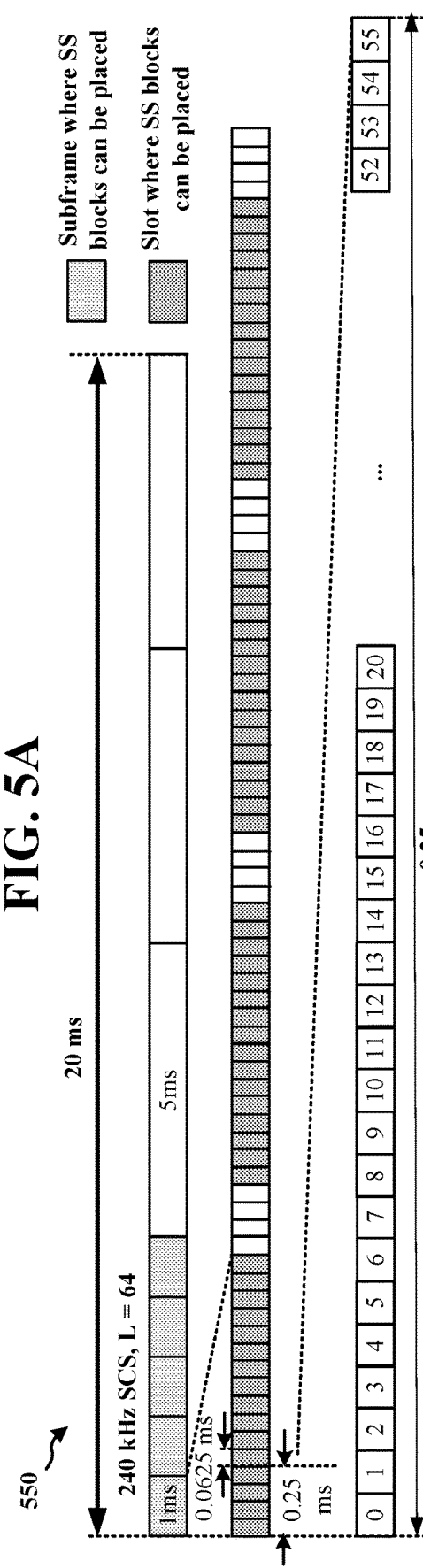
FIG. 5A
FIG. 5B

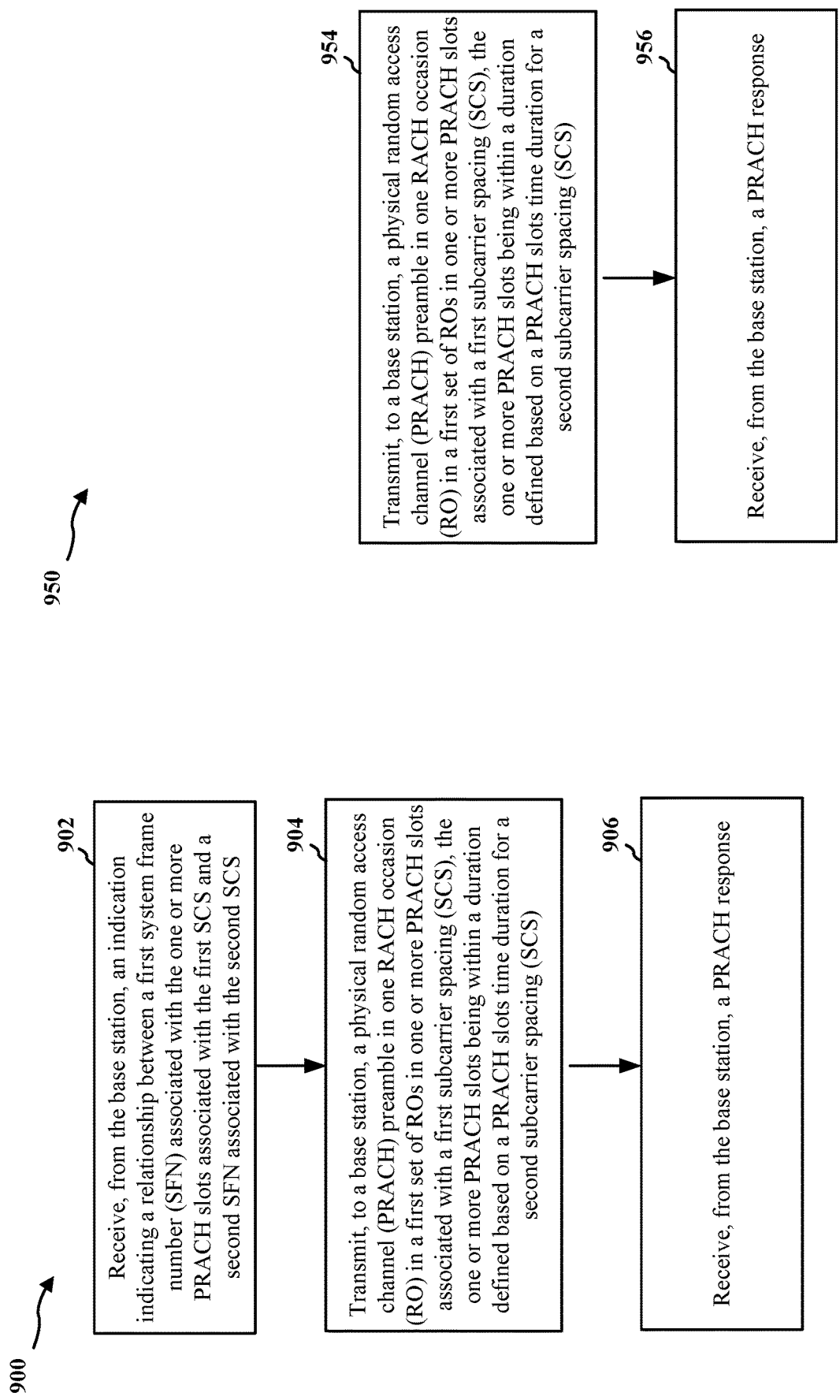

HIGH/LOW SCS RO ALIGNMENT

CROSS REFERENCE TO RELATED APPLICATION(S)

This application claims the benefit of and priority to U.S. Provisional Application Ser. No. 63/144,840, entitled "HIGH/LOW SCS RO ALIGNMENT" and filed on Feb. 2, 2021, which is expressly incorporated by reference herein in its entirety.

BACKGROUND

Technical Field

The present disclosure relates generally to communication systems, and more particularly, to wireless communication systems with physical random access channel (PRACH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The UE may transmit, to a base station, a physical random access channel (PRACH) preamble in one RACH occasion (RO) in a first set of ROs in one or more PRACH slots associated with a first subcarrier spacing (SCS), the one or more PRACH slots being within a duration defined based on a PRACH slots time duration for a second subcarrier spacing (SCS). The UE may receive, from the base station, a PRACH response.

In another aspect of the disclosure, a method, a computer-readable medium, and an apparatus at a base station are provided. The base station may receive, from a UE, a PRACH preamble in one RO in a first set of ROs in one or more PRACH slots associated with a first SCS, the one or more PRACH slots being within a duration defined based on a PRACH slots time duration for a second SCS. The base station may transmit, to the UE, a PRACH response.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A and 5B illustrate example SSB patterns.

FIG. 9A is a flowchart of a method of wireless communication at a UE.

FIG. 9B is a flowchart of a method of wireless communication at a UE.

DETAILED DESCRIPTION

Figure 1:
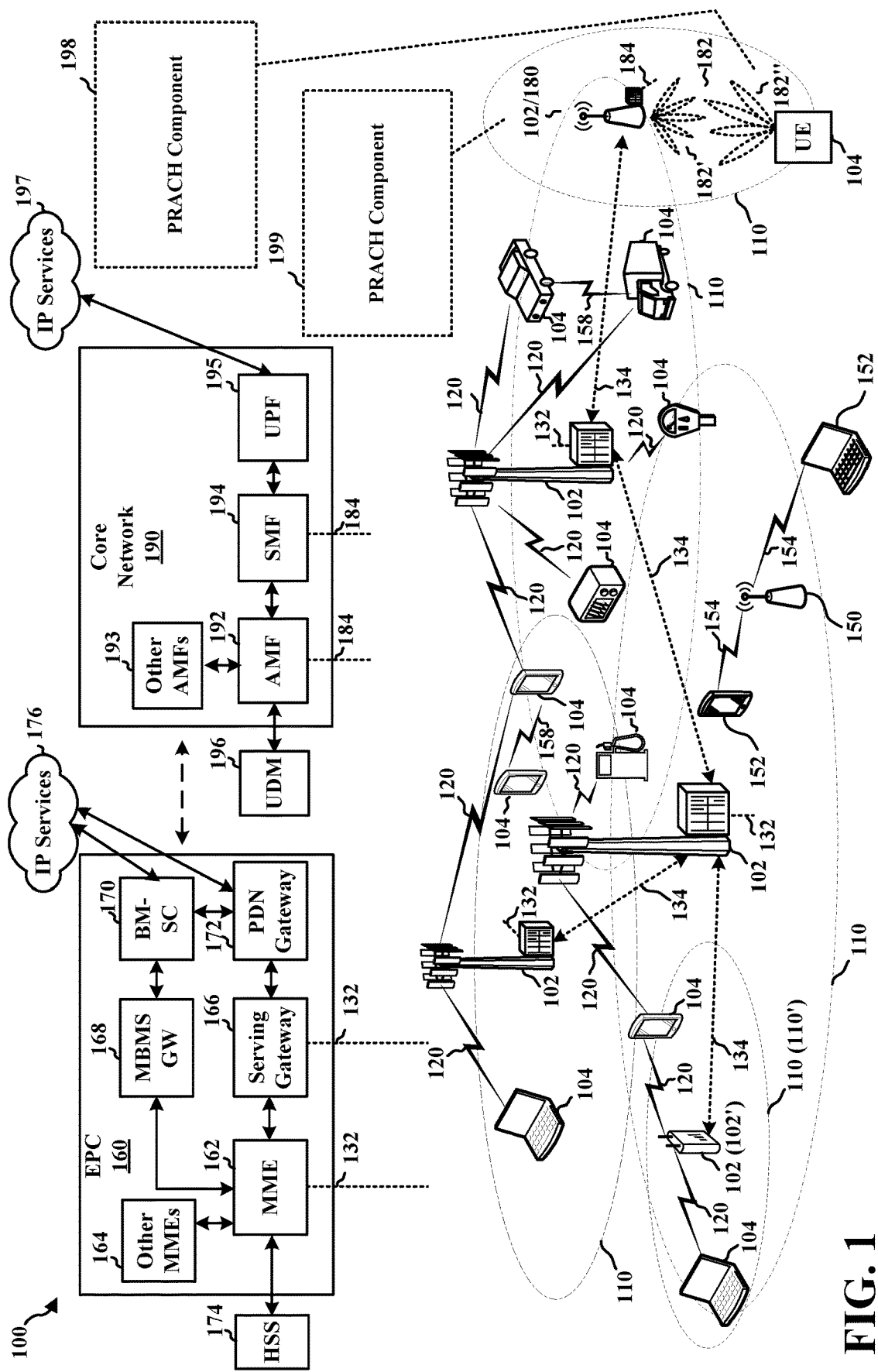
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PRACH component 198. In some aspects, the PRACH component 198 may be configured to transmit, to a base station, a PRACH preamble in one RO in a first set of ROs in one or more PRACH slots associated with a first SCS, the one or more PRACH slots being within a duration defined based on a PRACH slots time duration for a second SCS. In some aspects, the PRACH component 198 may be configured to receive, from the base station, a PRACH response. In certain aspects, the base station 180 may include a PRACH component 199. In some aspects, the PRACH component 199 may be configured to receive, from a UE, a PRACH preamble in one RO in a first set of ROs in one or more PRACH slots associated with a first SCS, the one or more PRACH slots being within a duration defined based on a PRACH slots time duration for a second SCS. In some aspects, the PRACH component 199 may be configured to transmit, to the UE, a PRACH response. Although the following description may be focused on 5G NR, the concepts described herein may be applicable to other similar areas, such as LTE, LTE-A, CDMA, GSM, and other wireless technologies.

Figure 2:
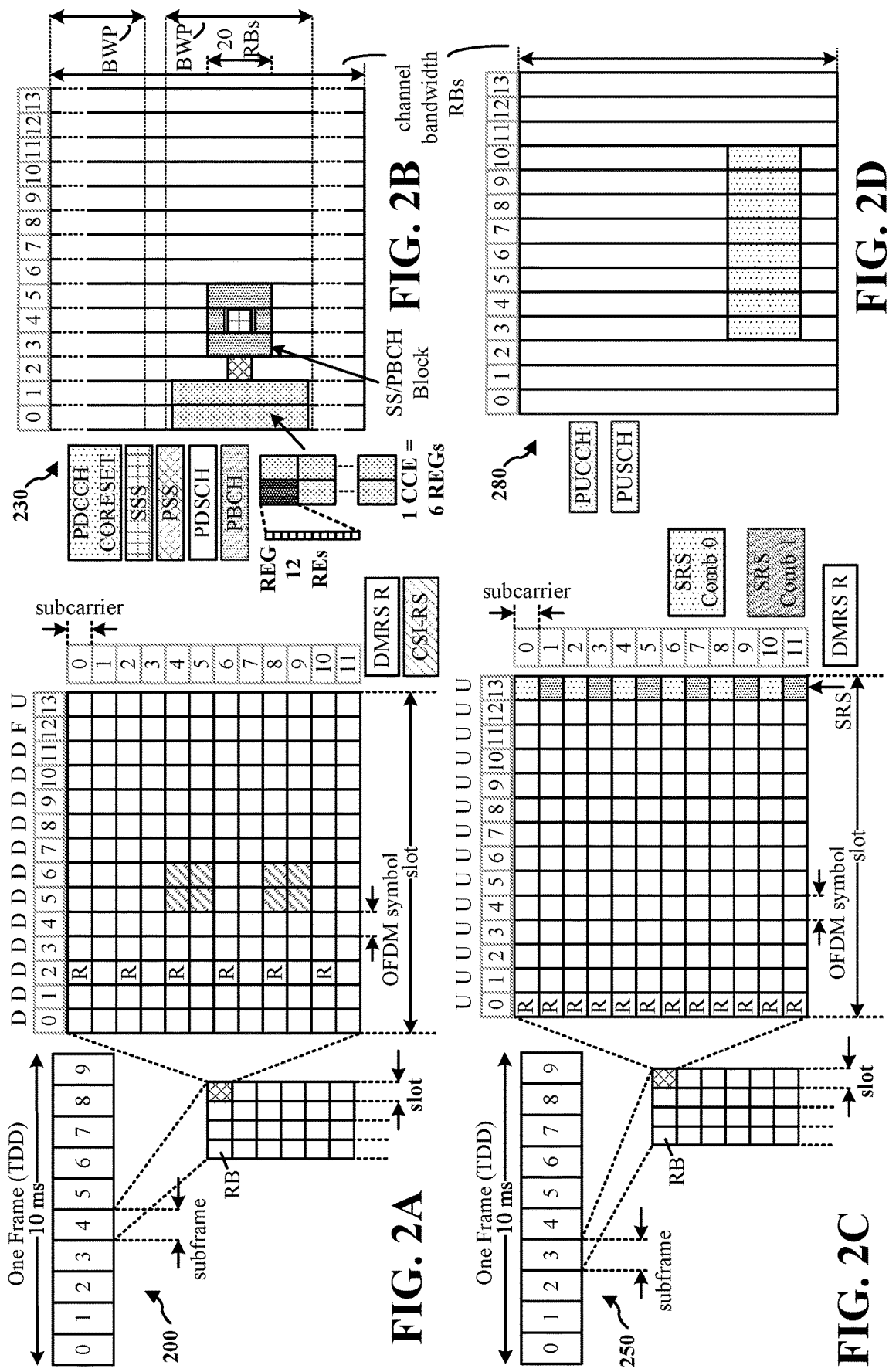
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended.

For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
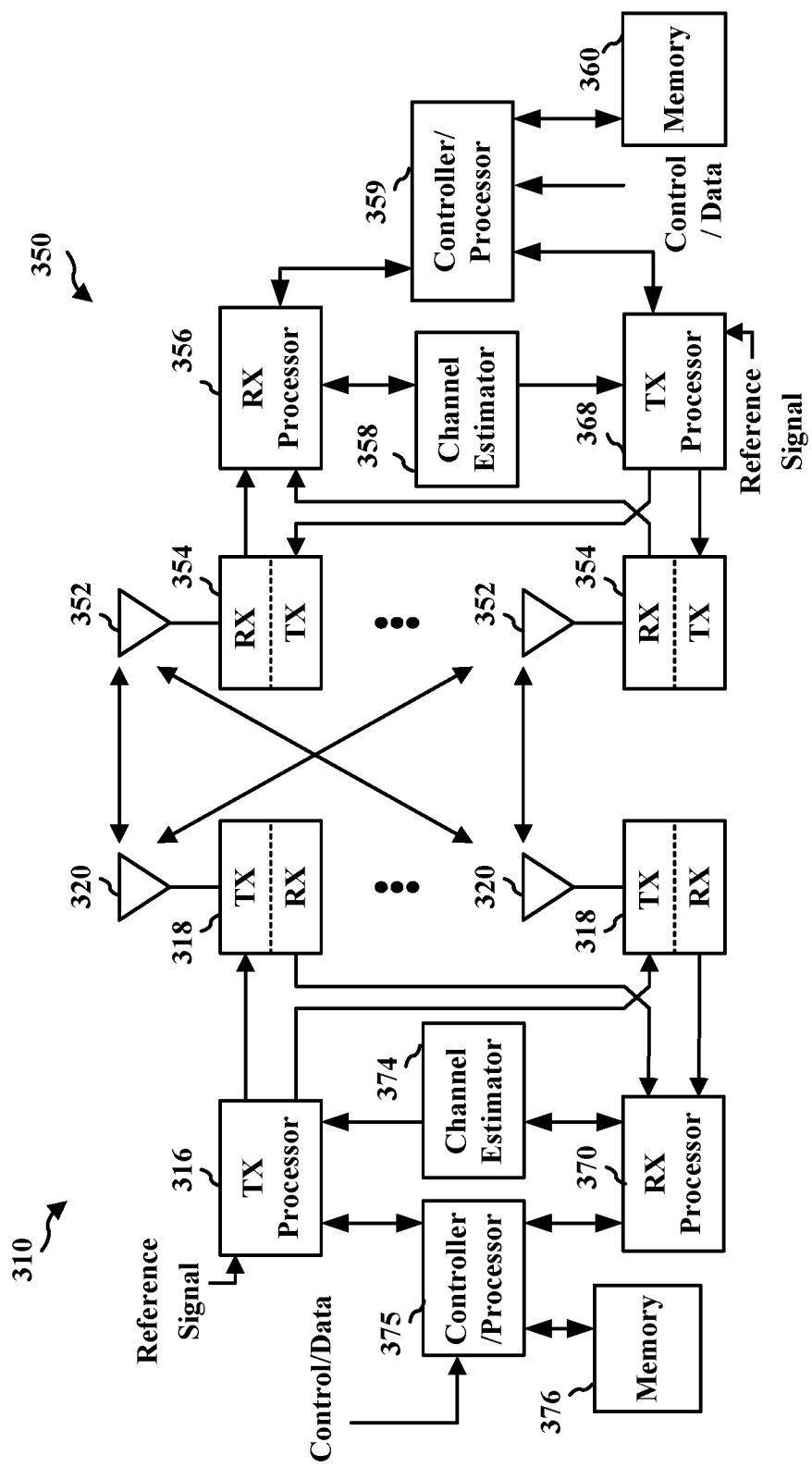
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with PRACH component 198 of FIG. 1.

At least one of the TX processor 316, the RX processor 370, and the controller/processor 375 may be configured to perform aspects in connection with PRACH component 199 of FIG. 1.

Figure 4B:
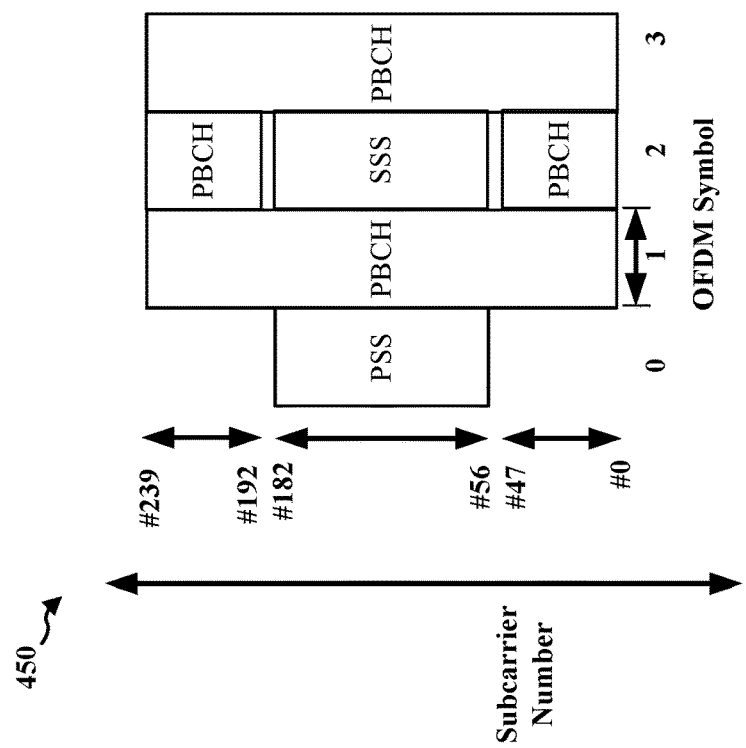
FIG. 4B illustrates an example SSB.
Figure 4A:
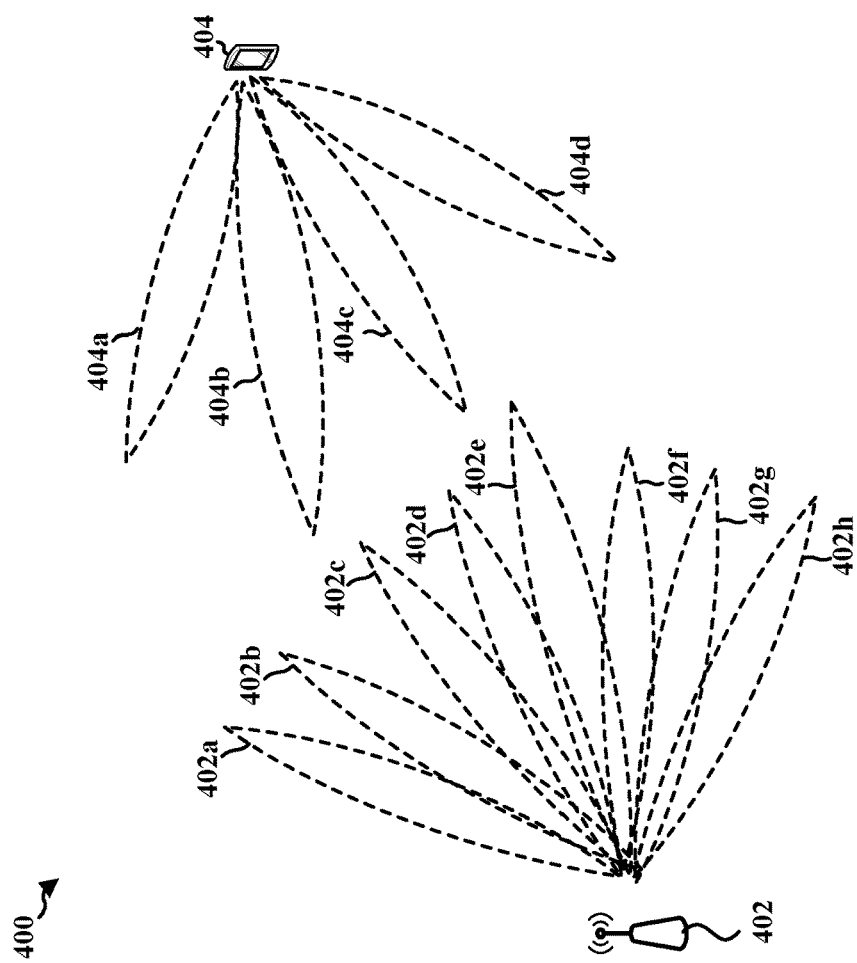
FIG. 4A is a diagram illustrating a base station in communication with a UE.

FIG. 4A is a diagram 400 illustrating a base station 402 in communication with a UE 404. Referring to FIG. 4A, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. In some aspects, the beamformed signal transmitted by the base station 402 may include an SSB, such as described in connection with FIG. 2B.

In response to different conditions, such as reception of a DCI indicating a beam update, as provided herein, the UE 404 may determine to switch beams, e.g., between beams 402a-402h or may determine that the base station will switch between beams. The beam at the UE 404 may be used for the reception of downlink communication and/or transmission of uplink communication. The beam at the base station 402 may be used for uplink reception and/or downlink transmission. In some examples, the base station 402 may send a transmission that triggers a beam switch by the UE 404.

In addition to a 120 kHz SCS used in some wireless communication systems, other SCS, such as 240 kHz, 480 kHz, and 960 kHz SCS may be used for wireless communication. In some aspects, a maximum bandwidth may be defined for wireless communication in a corresponding frequency range, e.g., for transmission/reception of data, control channels, and/or reference signals. In some aspects, a normal cyclic prefix (NCP) may be supported for the SCS. For example, in certain high frequency ranges, such as between 52.6 GHz and 71 GHz, a SCS of 240 kHz, 480 kHz, and/or 960 kHz may be used for SSB transmission by the base station 402, for initial access related signals/channels in an initial bandwidth part (BWP), and/or for SSB for non-initial access scenarios. In some aspects, the base station may transmit up to 64 SSB beams, e.g., using the licensed spectrum and/or the unlicensed spectrum in a frequency range, such as between 52.6 GHz and 71 GHz. In some aspects, an SCS of 240 kHz, 480 kHz, and/or 960 kHz may be used for SSB transmission and an additional SCS of an SCS of 480 kHz and/or 960 kHz may be used for signals and/or channels related to initial access in an initial BWP. In some aspects, an SCS of 480 kHz and/or 960 kHz may be used to transmit a SSB for wireless communication operations other than initial access. In some aspects, a common framework may be applied for 480 kHz and/or 960 kHz. Different PRACH sequence lengths such as L=139, L=571 and L=1151, may additionally be supported. The base station and the UE may also support a configuration for non-consecutive ROs in a time domain for operation in a shared spectrum.

In some wireless communication systems, a base station may transmit an SSB that receiving UEs may use for an initial cell search. FIG. 4B illustrates an example SSB 450. The SSB spans 4 OFDM symbols with 1 symbol for PSS, 2 symbols for PBCH, and 1 symbol with SSS and PBCH frequency domain multiplexed with each other. By way of example, in some wireless communication systems, an SCS of 15 kHz or 30 kHz may be used for FR1 and SCS of 120 kHz or 240 kHz may be used for FR2. The PSS may use a length 127 frequency domain-based M-sequence (mapped to 127 subcarriers). For example, the PSS may have 3 possible sequences. The SSS may use a length 127 frequency domain-based Gold Code sequence (2 M-sequences) (mapped to 127 subcarriers). By way of example there may be a total of 1008 possible sequences for the SSS. The PBCH may be QPSK modulated, and the UE may coherently demodulate the PBCH using an associated DM-RS from the base station.

FIGS. 5A and 5B illustrate example SSB patterns, e.g., for transmission using FR2. As illustrated in example 500 of FIG. 5A, for 120 kHz SCS and PRACH sequence length L=64, within 20 ms, there may be twenty 1 ms subframes. Each 1 ms subframe may include forty 0.125 ms slots and each 0.25 ms period may include 28 OFDM symbols. SSBs may be placed on particular, defined subframes/slots. In one example, within a 0.25 ms period, the two slots may include SSBs and OFDM symbols 4-7 may be associated with a first SSB, OFDM symbols 8-11 may be associated with a second SSB, OFDM symbols 16-19 may be associated with a third SSB, and OFDM symbols 20-23 may be associated with a fourth SSB.

As illustrated in example 550 of FIG. 5B, for 240 kHz SCS and PRACH sequence length L=64, within 20 ms, there may be twenty 1 ms subframes. Each 1 ms subframe may include eighty 0.0625 ms slots and each 0.25 ms period may include 56 OFDM symbols. SSBs may be placed on certain defined subframes/slots. In one example, within a 0.25 ms period, the four slots may include SSBs and OFDM symbols 8-11 may be associated with a first SSB, OFDM symbols 12-15 may be associated with a second SSB, OFDM symbols 16-19 may be associated with a third SSB, OFDM symbols 20-23 may be associated with a fourth SSB, OFDM symbols 32-35 may be associated with a fifth SSB, OFDM symbols 36-39 may be associated with a sixth SSB, OFDM symbols 40-43 may be associated with a seventh SSB, and OFDM symbols 44-47 may be associated with an eighth SSB.

Figure 6A:
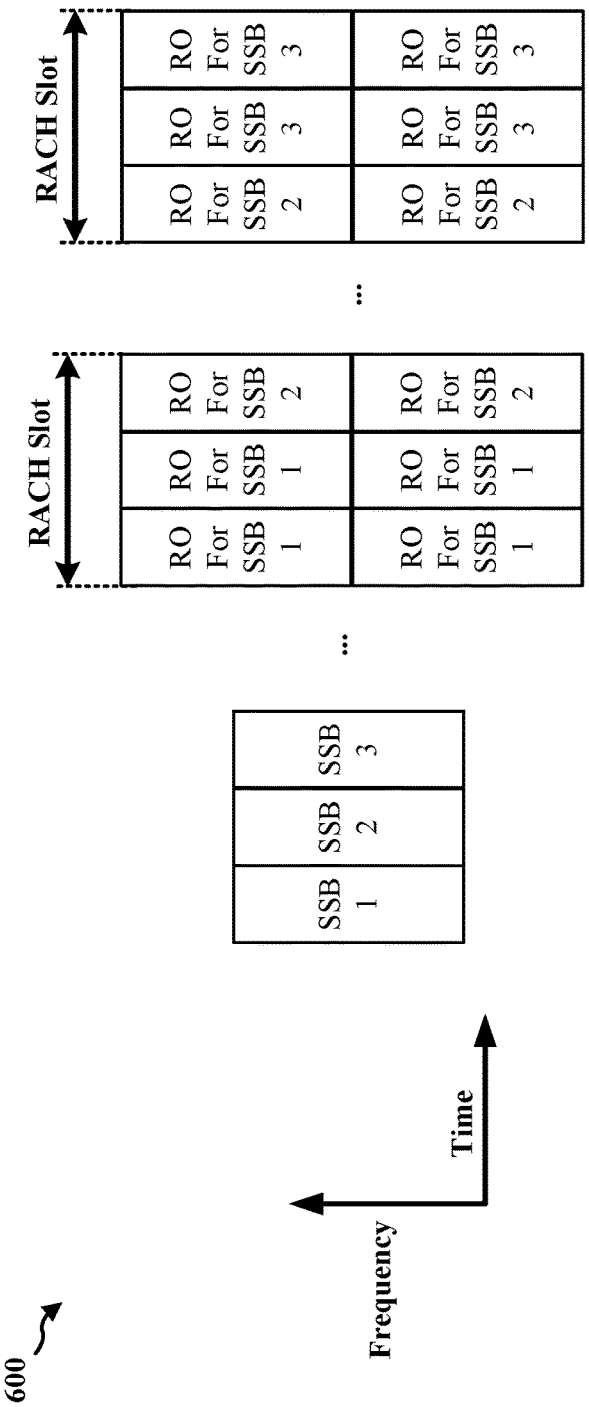
FIGS. 6A and 6B illustrate example SSB to PRACH association and beam switching gaps.

In order to initiate a random access procedure, a UE may transmit a PRACH to a base station in an RO. A RO may correspond to a defined set of time and frequency resources for transmission of the PRACH. Multiple ROs may be configured in a RACH slot. A configured RACH slot may repeat in each RACH configuration period. An SSB transmitted by the base station may be associated with one or more ROs to enable a base station to establish a beam to use for communication with the UE, i.e., to know what beam the UE has acquired/is using based on the RO that the UE uses to transmit the PRACH to the base station. In some aspects, one SSB may be associated with one or more ROs. In some aspects, more than one SSB may be associated with a single RO. The association may be in the frequency domain, then in the time domain within a RACH slot, then in the time domain across RACH slots. The UE that acquires, e.g., receives, a particular SSB from the base station may transmit a PRACH in an RO associated with the SSB. If multiple ROs are associated with the SSB, the UE may select one of the ROs to use for the PRACH transmission. In some aspects, the UE may randomly select one of the associated RO's so that the UE may transmit the PRACH in any of the ROs with equal probability. For example, as illustrated in example 600 of FIG. 6A, each SSB may be associated with four ROs. When a UE acquires SSB 1, the UE may transmit PRACH using any of the four RO's associated with SSB 1, based on a random selection with equal probability for each of the ROs. The association between the RO(s) and the SSB may be signaled from the base station to the UE in system information, such as system information block 1 (SIB1).

Figure 6B:
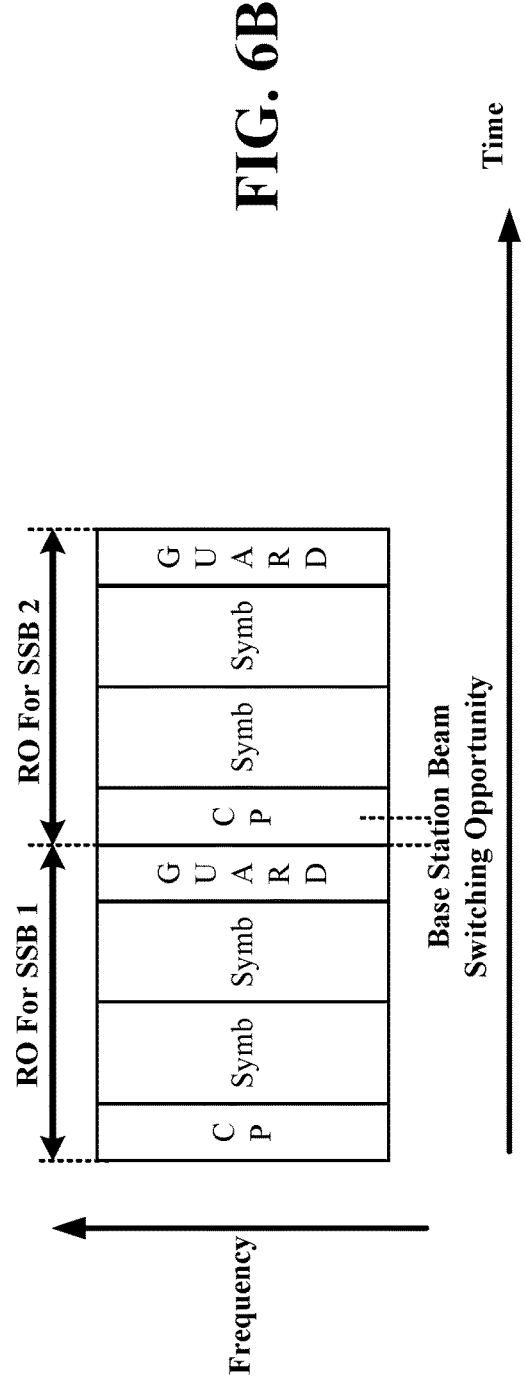

If a UE and/or a base station switches beams, the device may use an amount of time to switch between use of the different beams. For example, the base station may use a switching gap, e.g., time gap, between consecutive PRACHs associated with different SSBs (such as ~100 ns). For some wireless communication systems, as illustrated in example 650 in FIG. 6B, the PRACH cyclic prefix (CP) length is long enough to absorb the PRACH beam switching time gap and an explicit, or separate, time gap may not be needed to enable the base station to transition between use of different beams. However, for wireless communication systems using higher frequency bands, the CP length may be shorter than the switching gap due to a variety of reasons. As an example, the SCS may be increased to offset phase noise and to increase the overall channelization BW with a manageable fast Fourier transform (FFT) size which may lead to symbol and CP length decrease, as outlined in table 1 below. As another example, smaller cell sizes may be used due to higher path loss for higher bands which results in smaller delay spreads. As another example, the guard period may be used to account for UEs in different locations within the base station coverage area and may not be used for switching times.

TABLE 1

| U | 0 | 1 | 2 | 3 | 4 | 5 | 6 | 7 | 8 |
|---|---|---|---|---|---|---|---|---|---|
| SCS (kHz) | 15 | 30 | 60 | 120 | 240 | 480 | 960 | 1920 | 3840 |
| Tcp (ns) | 4687.5 | 2343.8 | 1171.9 | 585.9 | 293.0 | 146.5 | 73.2 | 36.6 | 18.3 |
| Tsymbol (ns) | 66666.7 | 33333.3 | 16666.7 | 8333.3 | 4166.7 | 2083.3 | 1041.7 | 520.8 | 260.4 |

Therefore, in some wireless communication systems, e.g., at some SCSs, the UL beam switching time may extend beyond a length of the CP. Aspects provided herein may resolve this issue by enabling a time gap that enables beam switching by the UE even at a higher SCS.

By way of example, a system operating in between 52.6 GHz and 71 GHz (may be referred to as FR2x or may be referred to by FR another name) may be designed to have SSB and/or PRACH SCS values based on a SCS of 120, 480, and/or 960 kHz. If a system is capable of both FR2 and FR2x bands, and carrier aggregation for FR2+FR2x is used, it may be beneficial for the link direction (DL or UL) on both FR2 and FR2x to be aligned in order to avoid inter-band DL/UL interference. Although the frequency ranges for FR2 and FR2x are separated by approximately 30 GHz (by way of example 28 GHz to 60 GHz), there may be high out-of-band interference between the 2 carrier frequencies (such as 28 GHz and 60 GHz). Some aspects provided herein provide DL (SSB) and UL (PRACH occasions) alignment across FR2 and FR2x, such as by introducing a nested SSB and PRACH occasion across FR2 and FR2x. In some aspects, separate antenna arrays may be used for FR2 and FR2x. In some aspects, the SSB and the RO for higher SCSs (e.g., 480 and 960 kHz) may be aligned with the lower SCS SSBs (e.g., 120 and 240 kHz) An SCell may not have a RACH. However, a cell may be configured as an SCell for one UE and as a PCell for another UE (e.g., a SCell may be a standalone cell having configured PRACH slots). For an unlicensed band, an effective isotropic radiated power (EIRP) may be limited, and frequency division multiplexing SSBs/ROs from different CCs may limit the power transmitted for each SSB/RO. In such aspects, the SSBs/ROs may be time division multiplexed while minimizing the beam switching. Aspects presented herein enable an SSB and RO configuration for a first SCS that aligns with an SSB at a second SCS. For example, aspects presented herein enable SSB and RO for higher SCSs (e.g., 480 and 960 kHz) to align with lower SSBs for lower SCSs (e.g., at 120 kHz and 240 kHz).

Figure 7:
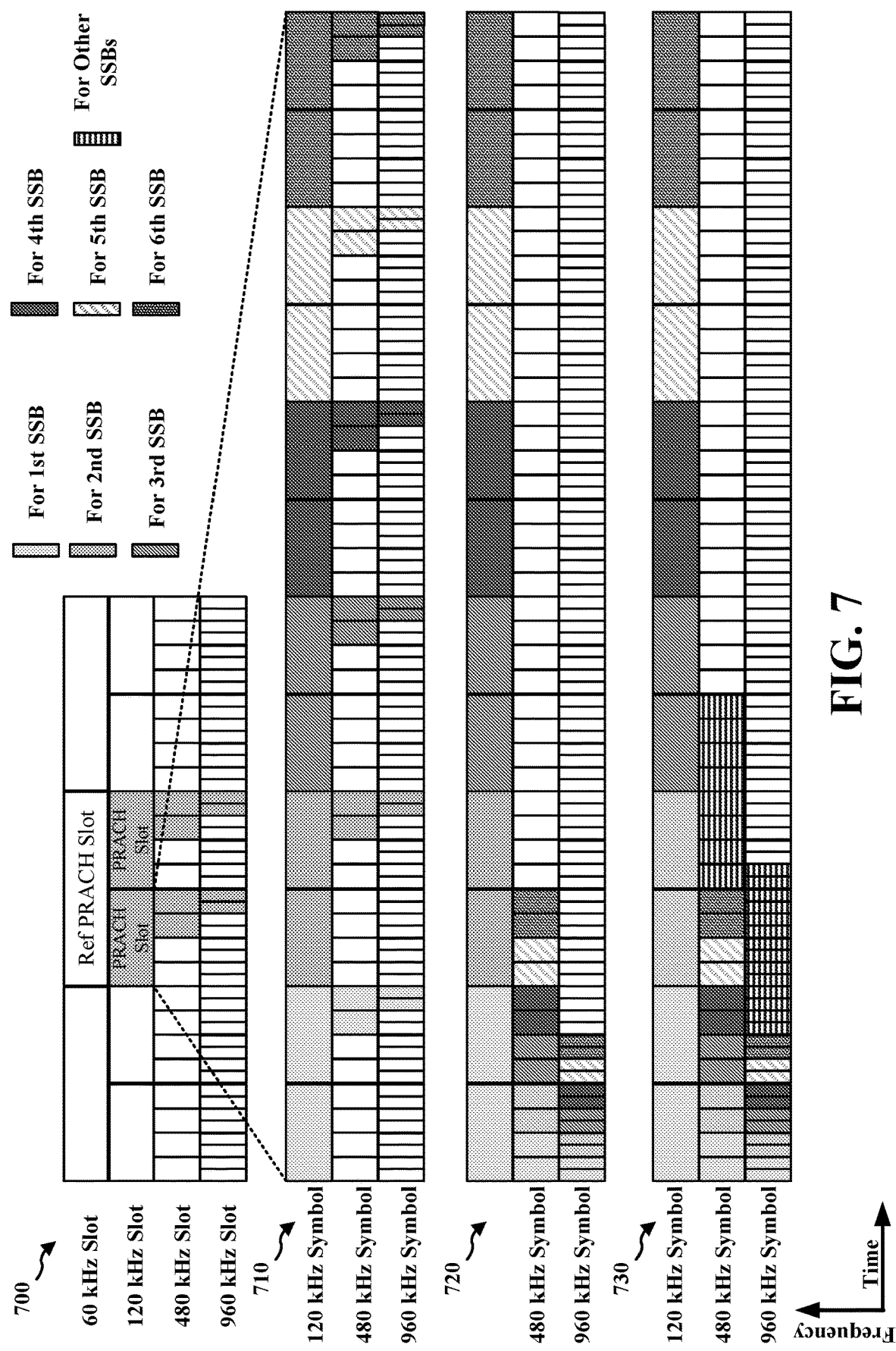
FIG. 7 illustrates example PRACH slot and RO locations for different SCS.

FIG. 7 illustrates example PRACH slot and RO locations in examples 700, 710, 720, and 730 for different SCS with alignment in accordance with various example aspects. As illustrated at 700 of FIG. 7, the PRACH Slots locations for a higher SCS, such as 480 kHz or 960 kHz, may be confined in time within a defined number of symbols immediately before or after the PRACH slots duration for a lower SCS, such as 120 kHz or 60 kHz. In some aspects, the ROs for different SCSs may be beam aligned, as illustrated in example 710. In other aspects, the ROs for different SCS may not be beam aligned, as illustrated in examples 720 and 730. In some aspects, time gaps, such as separations in time may be provided between ROs of consecutive beams. The time gaps between ROs of consecutive beams may include one or more symbols (which may be referred to as a symbol-level gap). The time gaps between ROs of consecutive beams may include one or more slots (which may be referred to as a slot-level gap).

In some aspects, the same number of PRACH slots and/or ROs may be configured per reference PRACH slot for each SCS, such as illustrated in the example at 700. In some aspects, a different number of PRACH slots and/or ROs may be configured per reference PRACH slot for each SCS, as illustrated in the example 730.

In some aspects, PRACH slots and RO locations may be based on a system frame number (SFN). For example, a UE and/or base station may determine a PRACH slot or RO location based on an SFN. In some aspects, the same PRACH slots and RO configuration for one cell (and based on a first SCS) may be based on a shifted SFN relative to a different cell (and a different SCS). In some aspects, the base station may signal information about the shift to a UE (e.g., a relationship between the SFN of a first cell relative to the SFN of a second cell for the purpose of PRACH slot/RO determination).

Figure 8:
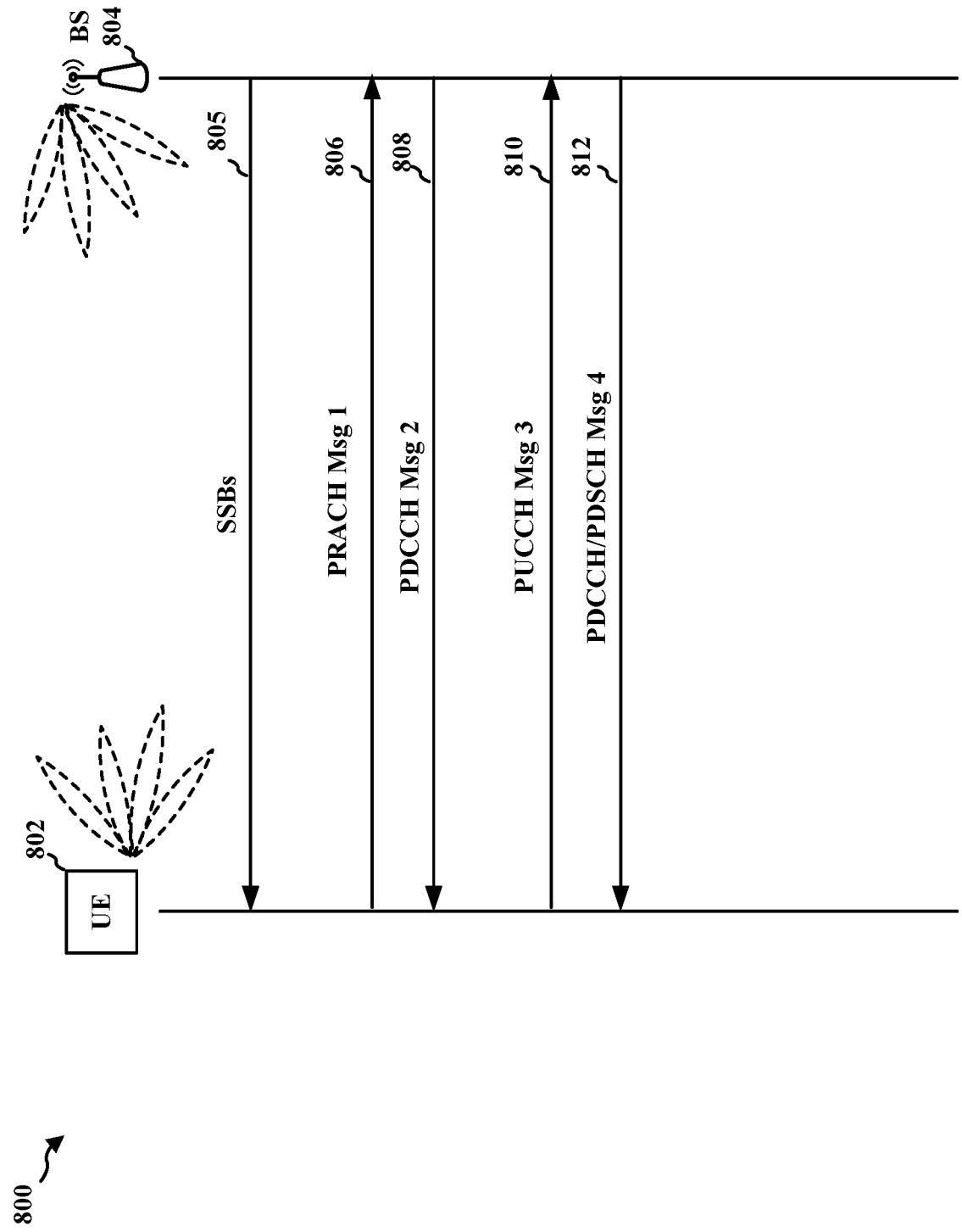
FIG. 8 illustrates an example communication flow between a base station and a UE.

FIG. 8 illustrates an example communication flow 800 that includes a UE 802 and a base station 804. The base station 804 may transmit SSBs on various beams, e.g., in a beam sweep pattern, as described herein. The SSB may include any of the aspects described in connection with FIGS. 4A-6B. The UE 802 may monitor for one or more SSBs 805. The UE 802 may select a beam for communication with the base station based on measurements performed on one or more SSB 805 received from the base station 804. In some aspects, the UE 802 may transmit a PRACH 806 to initiate a random access procedure with the base station 804 on a RO (e.g., time and/or frequency resources) having any of the aspects described in connection with FIG. 7. The UE may use a RO associated with the beam selected by the UE, which may indicate to the base station a beam having good signal quality for transmission/reception with the UE 802. The base station 804 may transmit a random access response (RAR) message 808, e.g., that includes a PDCCH as a response to the UE 802. In some aspects, the UE 802 may further transmit a PUCCH 810 to the base station 804 and receive a PDCCH/PDSCH 812 in response to the PUCCH 810. Although FIG. 8 illustrates an example of a four-step RACH procedure, the aspects presented herein may similarly be applied for a PRACH transmission from a UE to a base station for a two-step PRACH procedure in order to provide for alignment of ROs among various SCSs.

FIG. 9A is a flowchart 900 of a method of wireless communication. The method may be performed by a UE (e.g., the UE 104, the UE 350, the UE 404; the UE 802; the apparatus 1102). The method may enable the UE to transmit a PRACH to a base station having an alignment between different SCSs.

At 904, the UE may transmit, to a base station, a PRACH preamble in one RO in a first set of ROs in one or more PRACH slots associated with a first SCS, the one or more PRACH slots being within a duration defined based on a PRACH slots time duration for a second SCS. The UE may select a RO that is associated with a beam on which the UE received an SSB, e.g., as described in connection with any of FIGS. 4A-6B and/or 8. In some aspects, 904 may be performed by preamble component 1142 via the transmission component 1134 in FIG. 11. In some aspects, the one or more PRACH slots associated with the first SCS are for a first frequency range, and the PRACH slots time duration for the second SCS is for a second frequency range. For example, the second SCS may be for 60 kHz or 120 kHz and the first SCS may be for 240 kHz, 480 kHz, or 960 kHz.

In some aspects, a second set of ROs associated with the second SCS may be beam-aligned with the first set of ROs, e.g., as described in connection with the example 710 in FIG. 7. In some aspects, a second set of ROs associated with the second SCS may not be beam-aligned with the first set of ROs, e.g., as described in connection with the example 720 or 730 in FIG. 7. In some aspects, the first set of ROs may be associated with a first beam, and the first set of ROs may be followed in time by a second set of ROs associated, the first set of ROs being separated from the second set of ROs by a time gap, e.g., such as illustrated in the example 710 in FIG. 7. In some aspects, the gap may comprise one or more symbols. In some aspects, the gap may comprise one or more slots. In some aspects, a first number of PRACH slots may be configured for a first reference PRACH slot for the first SCS, and a second number of PRACH slots may be configured for a second reference PRACH slot for the second SCS. In some aspects, the first number equals the second number. In some aspects, the first number is different from the second number. In some aspects, a first number of ROs may be configured for a first reference PRACH slot for the first SCS and a second number of ROs may be configured for a second reference PRACH slot for the second SCS. In some aspects, the first number equals the second number, e.g., as illustrated in examples 710 and 720 in FIG. 7 that show equal numbers of ROs for different SCSs. In some aspects, the first number is different from the second number, e.g., as illustrated in example 730 in FIG. 7 that shows a different number of ROs for different SCSs.

At 906, the UE may receive, from the base station, a PRACH response. The PRACH response may include an RAR in some aspects. The PRACH response may include aspects described in connection with Msg 2 in FIG. 8. In some aspects, 906 may be performed by response component 1144 in FIG. 11.

As illustrated at 902, in some aspects, the UE may receive, from the base station, an indication indicating a relationship between a first SFN associated with the one or more PRACH slots associated with the first SCS and a second SFN associated with the second SCS. In some aspects, 902 may be performed by indication component 1146 in FIG. 11.

FIG. 9B is a flowchart 950 of a method of wireless communication. The method may be performed by a UE (e.g., the UE 104, the UE 350, the UE 404; the UE 802; the apparatus 1102). The method may enable the UE to transmit a PRACH to a base station having an alignment between different SCSs.

At 954, the UE may transmit, to a base station, a PRACH preamble in one RO in a first set of ROs in one or more PRACH slots associated with a first SCS, the one or more PRACH slots being within a duration defined based on a PRACH slots time duration for a second SCS. The UE may select a RO that is associated with a beam on which the UE received an SSB, e.g., as described in connection with any of FIGS. 4A-6B and/or 8. In some aspects, 954 may be performed by preamble component 1142 via the transmission component 1134 in FIG. 11. In some aspects, the one or more PRACH slots associated with the first SCS are for a first frequency range, and the PRACH slots time duration for the second SCS is for a second frequency range. For example, the second SCS may be for 60 kHz or 120 kHz and the first SCS may be for 240 kHz, 480 kHz, or 960 kHz.

In some aspects, a second set of ROs associated with the second SCS may be beam-aligned with the first set of ROs, e.g., as described in connection with the example 710 in FIG. 7. In some aspects, a second set of ROs associated with the second SCS may not be beam-aligned with the first set of ROs, e.g., as described in connection with the example 720 or 730 in FIG. 7. In some aspects, the first set of ROs may be associated with a first beam, and the first set of ROs may be followed in time by a second set of ROs associated, the first set of ROs being separated from the second set of ROs by a time gap, e.g., such as illustrated in the example 710 in FIG. 7. In some aspects, the gap may comprise one or more symbols. In some aspects, the gap may comprise one or more slots. In some aspects, a first number of PRACH slots may be configured for a first reference PRACH slot for the first SCS, and a second number of PRACH slots may be configured for a second reference PRACH slot for the second SCS. In some aspects, the first number equals the second number. In some aspects, the first number is different from the second number. In some aspects, a first number of ROs may be configured for a first reference PRACH slot for the first SCS and a second number of ROs may be configured for a second reference PRACH slot for the second SCS. In some aspects, the first number equals the second number, e.g., as illustrated in examples 710 and 720 in FIG. 7 that show equal numbers of ROs for different SCSs. In some aspects, the first number is different from the second number, e.g., as illustrated in example 730 in FIG. 7 that shows a different number of ROs for different SCSs.

At 956, the UE may receive, from the base station, a PRACH response. The PRACH response may include an RAR in some aspects. The PRACH response may include aspects described in connection with Msg 2 in FIG. 8. In some aspects, 956 may be performed by response component 1144 in FIG. 11.

Figures 10A, 10B:
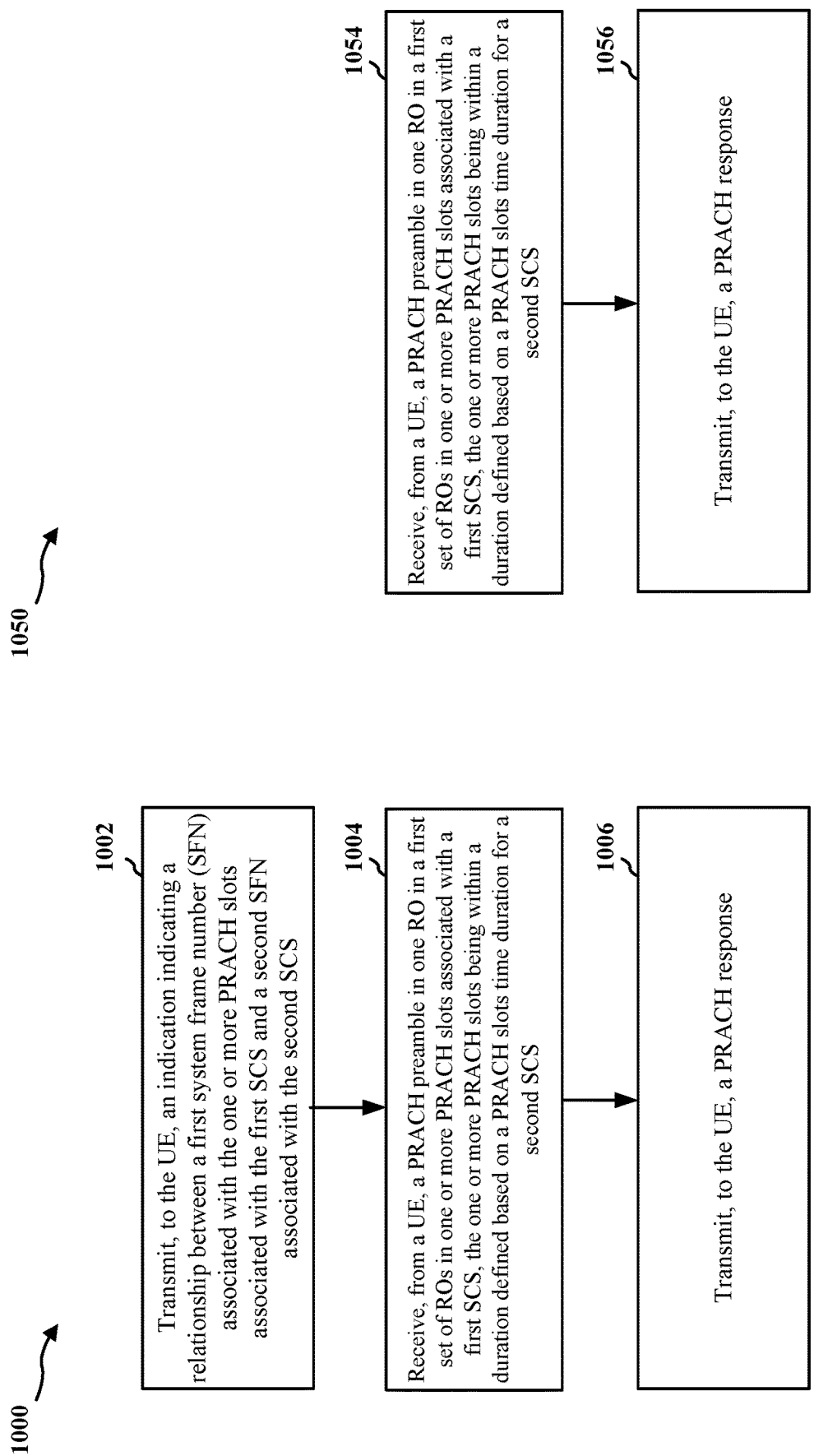
FIG. 10A is a flowchart of a method of wireless communication at a base station.
FIG. 10B is a flowchart of a method of wireless communication at a base station.

FIG. 10A is a flowchart 1000 of a method of wireless communication. The method may be performed by a base station (e.g., the base station 102/180, 310, 402, 804; the apparatus 1202. The method may enable an alignment between ROs for different SCSs.

At 1004, the base station may receive, from a UE, a PRACH preamble in one RO in a first set of ROs in one or more PRACH slots associated with a first SCS, the one or more PRACH slots being within a duration defined based on a PRACH slots time duration for a second SCS. The RO may correspond to a beam on which the UE received an SSB from the base station, e.g., as described in connection with any of FIGS. 4A-6B and/or 8. In some aspects, 1004 may be performed by preamble component 1142 in FIG. 11, e.g., via the reception component 1130. In some aspects, the one or more PRACH slots associated with the first SCS are for a first frequency range, and the PRACH slots time duration for the second SCS is for a second frequency range. For example, the second SCS may be for 60 kHz or 120 kHz and the first SCS may be for 240 kHz, 480 kHz, or 960 kHz.

In some aspects, a second set of ROs associated with the second SCS may be beam-aligned with the first set of ROs, e.g., as described in connection with the example 710 in FIG. 7. In some aspects, a second set of ROs associated with the second SCS may not be beam-aligned with the first set of ROs, e.g., as described in connection with the examples 720 or 730 in FIG. 7. In some aspects, the first set of ROs may be associated with a first beam, and the first set of ROs may be followed in time by a second set of ROs associated with a second SSB, the first set of ROs being separated from the second set of ROs by a time gap, e.g., as described in connection with the Example 710 in FIG. 7. In some aspects, the gap comprises one or more symbols. In some aspects, the gap comprises one or more slots. In some aspects, a first number of PRACH slots may be configured for a first reference PRACH slot for the first SCS and a second number of PRACH slots may be configured for a second reference PRACH slot for the second SCS. In some aspects, the first number equals the second number. In some aspects, the first number is different from the second number. In some aspects, a first number of ROs may be configured for a first reference PRACH slot for the first SCS and a second number of ROs may be configured for a second reference PRACH slot for the second SCS. In some aspects, the first number equals the second number, e.g., as in examples 710 and 720. In some aspects, the first number is different from the second number, e.g., as in example 730.

At 1006, the base station may transmit, to the UE, a PRACH response. The PRACH response may include a Msg 2, for example, as described in connection with FIG. 8. In some aspects, 1006 may be performed by response component 1144 in FIG. 11.

At 1002, the base station may transmit, to the UE, an indication indicating a relationship between a first SFN associated with the one or more PRACH slots associated with the first SCS and a second SFN associated with the second SCS. In some aspects, 1002 may be performed by indication component 1146 in FIG. 11.

FIG. 10B is a flowchart 1050 of a method of wireless communication. The method may be performed by a base station (e.g., the base station 102/180, 310, 402, 804; the apparatus 1202. The method may enable an alignment between ROs for different SCSs.

At 1054, the base station may receive, from a UE, a PRACH preamble in one RO in a first set of ROs in one or more PRACH slots associated with a first SCS, the one or more PRACH slots being within a duration defined based on a PRACH slots time duration for a second SCS. The RO may correspond to a beam on which the UE received an SSB from the base station, e.g., as described in connection with any of FIGS. 4A-6B and/or 8. In some aspects, 1054 may be performed by preamble component 1142 in FIG. 11, e.g., via the reception component 1130. In some aspects, the one or more PRACH slots associated with the first SCS are for a first frequency range, and the PRACH slots time duration for the second SCS is for a second frequency range. For example, the second SCS may be for 60 kHz or 120 kHz and the first SCS may be for 240 kHz, 480 kHz, or 960 kHz.

In some aspects, a second set of ROs associated with the second SCS may be beam-aligned with the first set of ROs, e.g., as described in connection with the example 710 in FIG. 7. In some aspects, a second set of ROs associated with the second SCS may not be beam-aligned with the first set of ROs, e.g., as described in connection with the examples 720 or 730 in FIG. 7. In some aspects, the first set of ROs may be associated with a first beam, and the first set of ROs may be followed in time by a second set of ROs associated with a second SSB, the first set of ROs being separated from the second set of ROs by a time gap, e.g., as described in connection with the Example 710 in FIG. 7. In some aspects, the gap comprises one or more symbols. In some aspects, the gap comprises one or more slots. In some aspects, a first number of PRACH slots may be configured for a first reference PRACH slot for the first SCS and a second number of PRACH slots may be configured for a second reference PRACH slot for the second SCS. In some aspects, the first number equals the second number. In some aspects, the first number is different from the second number. In some aspects, a first number of ROs may be configured for a first reference PRACH slot for the first SCS and a second number of ROs may be configured for a second reference PRACH slot for the second SCS. In some aspects, the first number equals the second number, e.g., as in examples 710 and 720. In some aspects, the first number is different from the second number, e.g., as in example 730.

At 1056, the base station may transmit, to the UE, a PRACH response. The PRACH response may include a Msg 2, for example, as described in connection with FIG. 8. In some aspects, 1056 may be performed by response component 1144 in FIG. 11.

Figure 11:
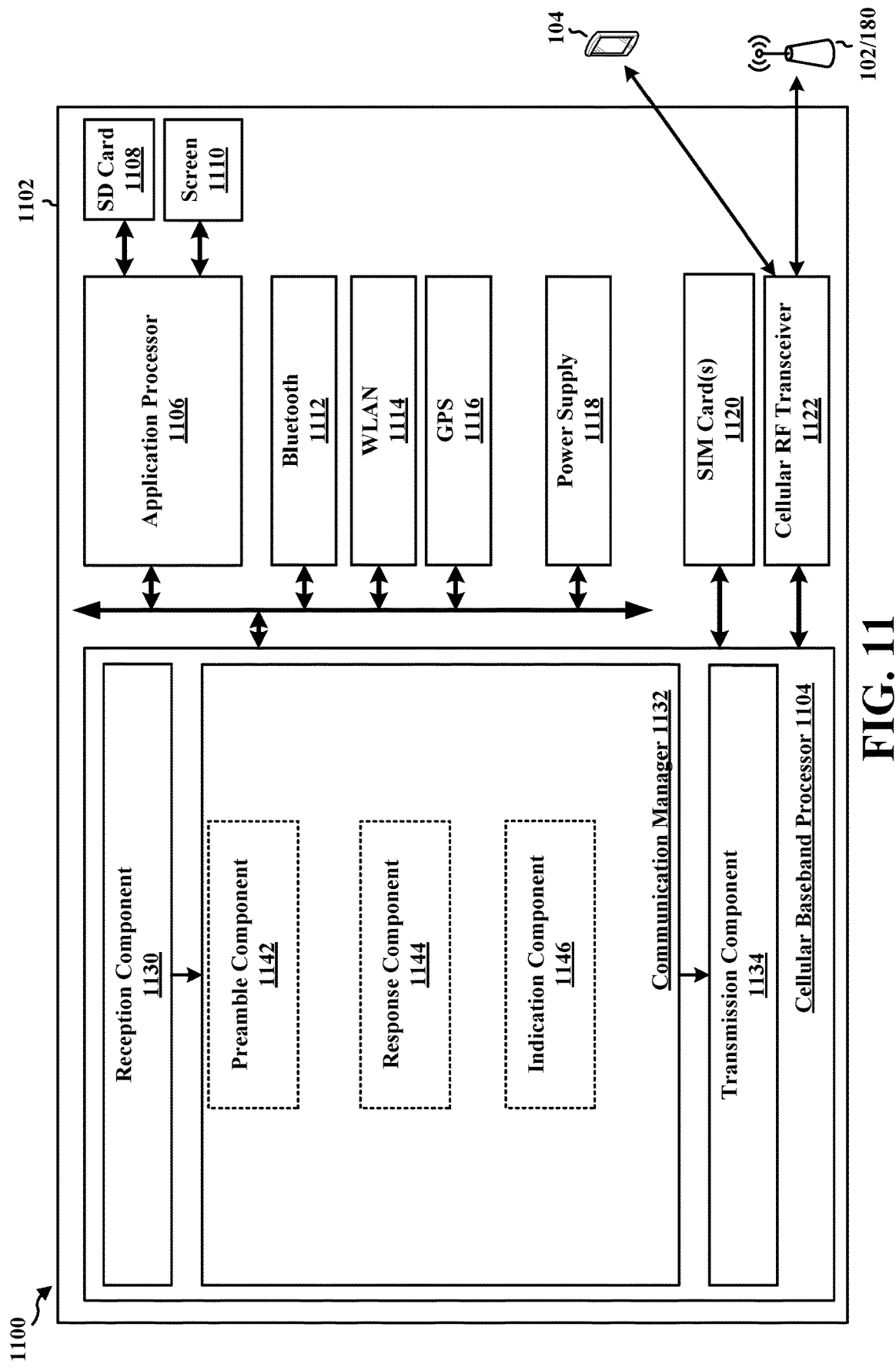
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more of subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/ memory. The computer-readable medium/memory may be non-transitory. The cellular baseband processor 1104 is responsible for general processing, including the execution of software stored on the computer-readable medium/ memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include a preamble component 1142 that is configured to transmit, to a base station, a PRACH preamble in one RO in a first set of ROs in one or more PRACH slots associated with a first SCS, the one or more PRACH slots being within a duration defined based on a PRACH slots time duration for a second SCS, e.g., as described in connection with 904 in FIG. 9A or 954 in FIG. 9B. The communication manager 1132 may further include a response component 1144 that is configured to receive, from the base station, a PRACH response, e.g., as described in connection with 906 in FIG. 9A or 956 in FIG. 9B. The communication manager 1132 may further include an indication component 1146 that is configured to receive, from the base station, an indication indicating a relationship between a first system frame number (SFN) associated with the one or more PRACH slots associated with the first SCS and a second SFN associated with the second SCS, e.g., as described in connection with 902 in FIG. 9A.

The apparatus may include additional components that perform each of the blocks of the algorithm in the flowcharts of FIGS. 9A-9B. As such, each block in the flowcharts of FIGS. 9A-9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for transmitting, to a base station, a PRACH preamble in one RO in a first set of ROs in one or more PRACH slots associated with a first SCS, the one or more PRACH slots being within a duration defined based on a PRACH slots time duration for a second SCS. The cellular baseband processor 1104 may further include means for receiving, from the base station, a PRACH response. The cellular baseband processor 1104 may further include means for receiving, from the base station, an indication indicating a relationship between a first system frame number (SFN) associated with the one or more PRACH slots associated with the first SCS and a second SFN associated with the second SCS.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
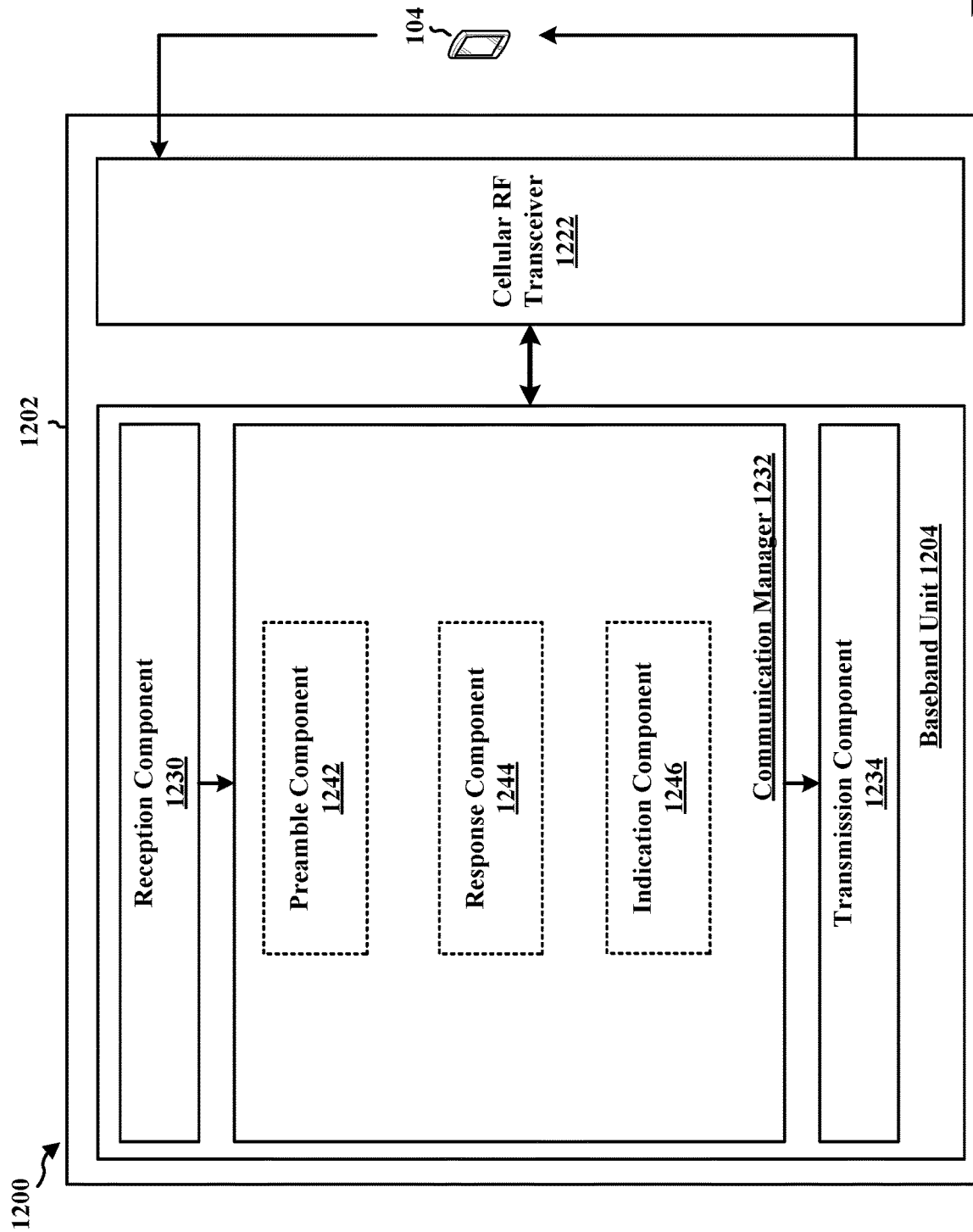
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include a preamble component 1242 that receives, from a UE, a PRACH preamble in one RO in a first set of ROs in one or more PRACH slots associated with a first SCS, the one or more PRACH slots being within a duration defined based on a PRACH slots time duration for a second SCS, e.g., as described in connection with 1004 in FIG. 10A or 1054 in FIG. 10B. The communication manager 1232 may further include a response component 1244 that transmits, to the UE, a PRACH response, e.g., as described in connection with 1006 in FIG. 10A or 1056 in FIG. 10B. The communication manager 1232 may further include an indication component 1246 that transmits, to the UE, an indication indicating a relationship between a first SFN associated with the one or more PRACH slots associated with the first SCS and a second SFN associated with the second SCS, e.g., as described in connection with 1002 in FIG. 10A.

The apparatus may include additional components that perform each of the blocks of the algorithm in the flowcharts of FIGS. 10A-B. As such, each block in the flowcharts of FIGS. 10A-B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a UE, a PRACH preamble in one RO in a first set of ROs in one or more PRACH slots associated with a first SCS, the one or more PRACH slots being within a duration defined based on a PRACH slots time duration for a second SCS. The baseband unit 1204 may further include means for transmitting, to the UE, a PRACH response. The baseband unit 1204 may further include means for transmitting, to the UE, an indication indicating a relationship between a first SFN associated with the one or more PRACH slots associated with the first SCS and a second SFN associated with the second SCS.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: transmitting, to a base station, a PRACH preamble in one RO in a first set of ROs in one or more PRACH slots associated with a first SCS, the one or more PRACH slots being within a duration defined based on a PRACH slots time duration for a second SCS; and receiving, from the base station, a PRACH response.

Aspect 2 is the method of aspect 1, wherein the one or more PRACH slots associated with the first SCS are for a first frequency range, and the PRACH slots time duration for the second SCS is for a second frequency range.

Aspect 3 is the method of any of aspects 1-2, wherein a second set of ROs associated with the second SCS is beam-aligned with the first set of ROs.

Aspect 4 is the method of any of aspects 1-2, wherein a second set of ROs associated with the second SCS is not beam-aligned with the first set of ROs.

Aspect 5 is the method of any of aspects 1-4, wherein the first set of ROs is associated with a first beam, and wherein the first set of ROs is followed in time by a second set of ROs associated, the first set of ROs being separated from the second set of ROs by a time gap.

Aspect 6 is the method of any of aspects 1-5, wherein the time gap comprises one or more symbols.

Aspect 7 is the method of any of aspects 1-6, wherein the time gap comprises one or more slots.

Aspect 8 is the method of any of aspects 1-7, wherein a first number of PRACH slots is configured for a first reference PRACH slot for the first SCS and a second number of PRACH slots is configured for a second reference PRACH slot for the second SCS.

Aspect 9 is the method of any of aspects 1-8, wherein the first number equals the second number.

Aspect 10 is the method of any of aspects 1-8, wherein the first number is different from the second number.

Aspect 11 is the method of any of aspects 1-10, wherein a first number of ROs is configured for a first reference PRACH slot for the first SCS and a second number of ROs is configured for a second reference PRACH slot for the second SCS.

Aspect 12 is the method of any of aspects 1-11, wherein the first number equals the second number.

Aspect 13 is the method of any of aspects 1-11, wherein the first number is different from the second number.

Aspect 14 is the method of any of aspects 1-13, further comprising: receiving, from the base station, an indication indicating a relationship between a first SFN associated with the one or more PRACH slots associated with the first SCS and a second SFN associated with the second SCS.

Aspect 15 is a method of wireless communication at a base station, comprising: receiving, from a UE, a PRACH preamble in one RO in a first set of ROs in one or more PRACH slots associated with a first SCS, the one or more PRACH slots being within a duration defined based on a PRACH slots time duration for a second SCS; and transmitting, to the UE, a PRACH response.

Aspect 16 is the method of aspect 15, wherein the one or more PRACH slots associated with the first SCS are for a first frequency range, and the PRACH slots time duration for the second SCS is for a second frequency range.

Aspect 17 is the method of any of aspects 15-16, wherein a second set of ROs associated with the second SCS is beam-aligned with the first set of ROs.

Aspect 18 is the method of any of aspects 15-16, wherein a second set of ROs associated with the second SCS is not beam-aligned with the first set of ROs.

Aspect 19 is the method of any of aspects 15-18, wherein the first set of ROs is associated with a first beam, and wherein the first set of ROs is followed in time by a second set of ROs associated, the first set of ROs being separated from the second set of ROs by a time gap.

Aspect 20 is the method of any of aspects 15-19, wherein the time gap comprises one or more symbols.

Aspect 21 is the method of any of aspects 15-20, wherein the time gap comprises one or more slots.

Aspect 22 is the method of any of aspects 15-21, wherein a first number of PRACH slots is configured for a first reference PRACH slot for the first SCS and a second number of PRACH slots is configured for a second reference PRACH slot for the second SCS.

Aspect 23 is the method of any of aspects 15-22, wherein the first number equals the second number.

Aspect 24 is the method of any of aspects 15-22, wherein the first number is different from the second number.

Aspect 25 is the method of any of aspects 15-24, wherein a first number of ROs is configured for a first reference PRACH slot for the first SCS and a second number of ROs is configured for a second reference PRACH slot for the second SCS.

Aspect 26 is the method of any of aspects 15-25, wherein the first number equals the second number.

Aspect 27 is the method of any of aspects 15-25, wherein the first number is different from the second number.

Aspect 28 is the method of any of aspects 15-27, further comprising: transmitting, to the UE, an indication indicating a relationship between a first SFN associated with the one or more PRACH slots associated with the first SCS and a second SFN associated with the second SCS.

Aspect 29 is an apparatus for wireless communication including at least one processor coupled to a memory and configured to implement a method as in any of aspects 1 to 14.

Aspect 30 is an apparatus for wireless communication including at least one processor coupled to a memory and configured to implement a method as in any of aspects 15 to 28.

Aspect 31 is an apparatus for wireless communication including means for implementing a method as in any of aspects 1 to 14.

Aspect 32 is an apparatus for wireless communication including means for implementing a method as in any of aspects 15 to 28.

Aspect 33 is a computer-readable medium storing computer executable code, where the code when executed by a processor causes the processor to implement a method as in any of aspects 1 to 14.

Aspect 34 is a computer-readable medium storing computer executable code, where the code when executed by a processor causes the processor to implement a method as in any of aspects 15 to 28.

What is claimed is:

1. An apparatus for wireless communication at a user equipment (UE), comprising:
    memory; and
    at least one processor coupled to the memory and configured to:
        receive, from a base station, an indication that indicates a relationship between a first system frame number (SFN) associated with one or more physical random access channel (PRACH) slots associated with a first subcarrier spacing (SCS) and a second SFN associated with a second SCS;
        transmit, to the base station, a PRACH preamble in one RACH occasion (RO) in a first set of ROs in one or more PRACH slots associated with the first SCS, the one or more PRACH slots being within a duration defined based on a PRACH slots time duration for the second SCS; and
        receive, from the base station, a PRACH response.

2. The apparatus of claim 1, wherein the first set of ROs is associated with a first beam, and wherein the first set of ROs is followed in time by a second set of ROs associated, the first set of ROs being separated from the second set of ROs by a time gap.

3. The apparatus of claim 2, wherein the time gap comprises one or more symbols.

4. The apparatus of claim 2, wherein the time gap comprises one or more slots.

5. The apparatus of claim 1, wherein a first number of PRACH slots is configured for a first reference PRACH slot for the first SCS and a second number of PRACH slots is configured for a second reference PRACH slot for the second SCS.

6. The apparatus of claim 5, wherein the first number of PRACH slots equals the second number of PRACH slots.

7. The apparatus of claim 5, wherein the first number of PRACH slots is different from the second number of PRACH slots.

8. The apparatus of claim 1, wherein a first number of ROs is configured for a first reference PRACH slot for the first SCS and a second number of ROs is configured for a second reference PRACH slot for the second SCS.

9. The apparatus of claim 8, wherein the first number of ROs equals the second number of ROs.

10. The apparatus of claim 8, wherein the first number of ROs is different from the second number of ROs.

11. The apparatus of claim 1, wherein the one or more PRACH slots associated with the first SCS are for a first frequency range, and the PRACH slots time duration for the second SCS is for a second frequency range.

12. The apparatus of claim 1, wherein a second set of ROs associated with the second SCS is beam-aligned with the first set of ROs.

13. The apparatus of claim 1, wherein a second set of ROs associated with the second SCS is not beam-aligned with the first set of ROs.

14. An apparatus for wireless communication at a base station, comprising:
    memory; and
    at least one processor coupled to the memory and configured to:
        transmit, to a user equipment (UE), an indication that indicates a relationship between a first system frame number (SFN) associated with one or more physical random access channel (PRACH) slots associated with a first subcarrier spacing (SCS) and a second SFN associated with a second SCS;
        receive, from the UE, a PRACH preamble in one RACH occasion (RO) in a first set of ROs in one or more PRACH slots associated with the first SCS, the one or more PRACH slots being within a duration defined based on a PRACH slots time duration for the second SCS; and
        transmit, to the UE, a PRACH response.

15. The apparatus of claim 14, wherein the first set of ROs is associated with a first beam, and wherein the first set of ROs is followed in time by a second set of ROs associated, the first set of ROs being separated from the second set of ROs by a time gap.

16. The apparatus of claim 15, wherein the time gap comprises one or more symbols.

17. The apparatus of claim 15, wherein the time gap comprises one or more slots.

18. The apparatus of claim 14, wherein a first number of PRACH slots is configured for a first reference PRACH slot for the first SCS and a second number of PRACH slots is configured for a second reference PRACH slot for the second SCS.

19. The apparatus of claim 18, wherein the first number of PRACH slots equals the second number of PRACH slots.

20. The apparatus of claim 18, wherein the first number of PRACH slots is different from the second number of PRACH slots.

21. The apparatus of claim 14, wherein a first number of ROs is configured for a first reference PRACH slot for the first SCS and a second number of ROs is configured for a second reference PRACH slot for the second SCS.

22. The apparatus of claim 21, wherein the first number of ROs equals the second number of ROs.

23. The apparatus of claim 21, wherein the first number of ROs is different from the second number of ROs.

24. The apparatus of claim 14, wherein the one or more PRACH slots associated with the first SCS are for a first frequency range, and the PRACH slots time duration for the second SCS is for a second frequency range.

25. The apparatus of claim 14, wherein a second set of ROs associated with the second SCS is beam-aligned with the first set of ROs.

26. The apparatus of claim 14, wherein a second set of ROs associated with the second SCS is not beam-aligned with the first set of ROs.

27. A method of wireless communication at a user equipment (UE), comprising:
receiving, from a base station, an indication that indicates a relationship between a first system frame number (SFN) associated with one or more physical random access channel PRACH) slots associated with a first subcarrier spacing (SCS) and a second SFN associated with a second SCS;
transmitting, to the base station, a PRACH preamble in one RACH occasion (RO) in a first set of ROs in one or more PRACH slots associated with the first SCS, the one or more PRACH slots being within a duration defined based on a PRACH slots time duration for the second SCS; and
receiving, from the base station, a PRACH response.

28. A method of wireless communication at a base station, comprising:
transmitting, to a user equipment (UE), an indication that indicates a relationship between a first system frame number (SFN) associated with one or more physical random access channel (PRACH) slots associated with a first subcarrier spacing (SCS) and a second SFN associated with a second SCS;
receiving, from the UE, a PRACH preamble in one RACH occasion (RO) in a first set of ROs in one or more PRACH slots associated with the first SCS, the one or more PRACH slots being within a duration defined based on a PRACH slots time duration for the second SCS; and
transmitting, to the UE, a PRACH response.

* * * * *